CARRIER AND RADIO TERMINATION FOR TELEPHONE CIRCUITS

Filed Sept. 16, 1948 5 Sheets-Sheet 1

INVENTORS
EVERHARD H. B. BARTELINK
& EDWARD DASKAM, JR.
By Ward, Crosby & Neal ATTORNEYS.

INVENTORS
EVERHARD H. B. BARTELINK
& EDWARD DASKAM, JR.
By Lord, Craig & Neal
ATTORNEYS.

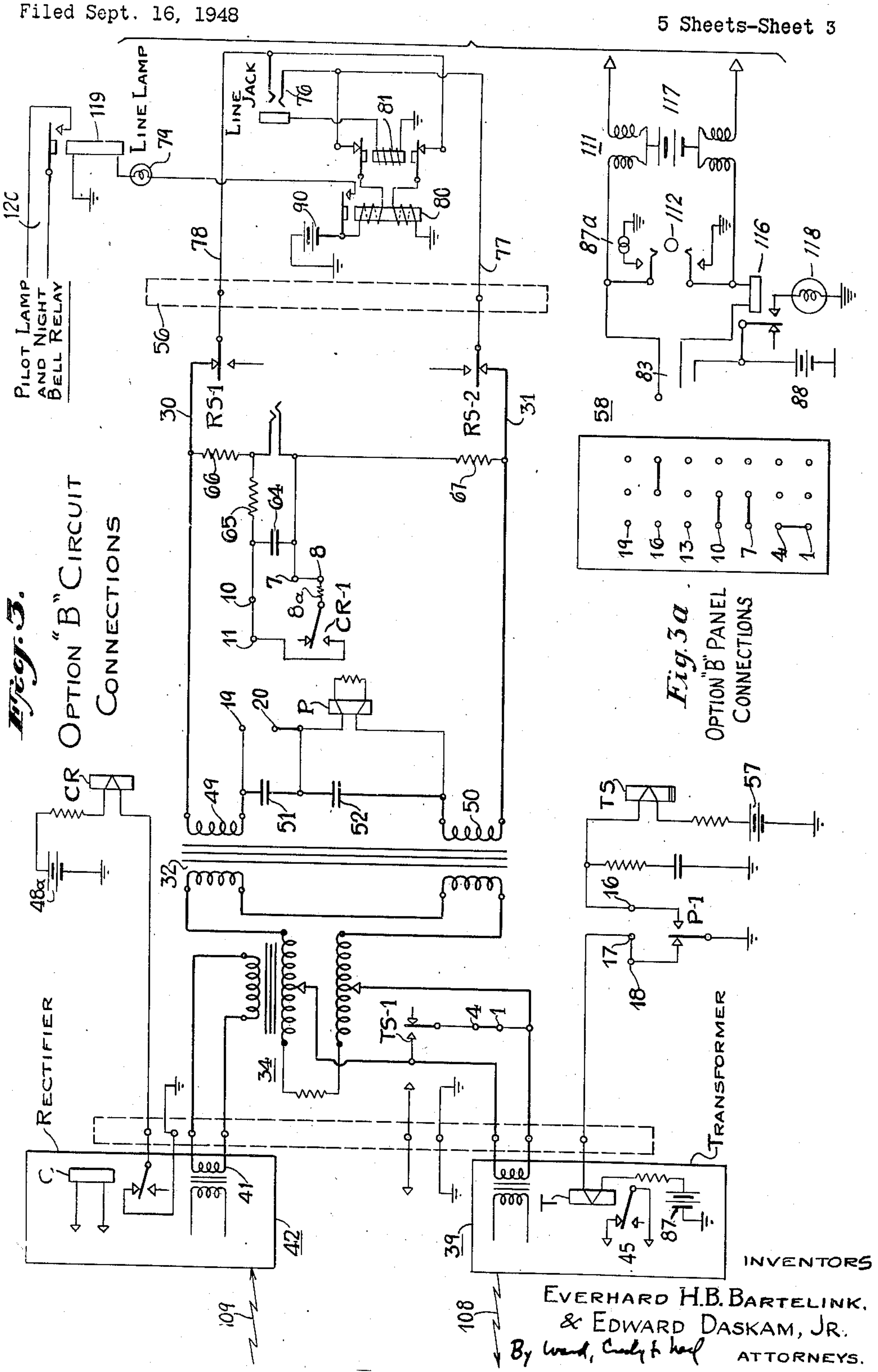
Fig. 3. Option "B" Circuit Connections
Fig. 3a Option "B" Panel Connections
INVENTORS
Everhard H.B. Bartelink,
& Edward Daskam, Jr.
By Ward, Crosby & Neal
ATTORNEYS.

INVENTORS
EVERHARD H. B. BARTELINK
& EDWARD DASKAM, JR.
By Ward, Crosby & Neal ATTORNEYS.

INVENTORS
Everhard H. B. Bartelink,
& Edward Daskam, Jr.
By Ward, Crosby & Neal
ATTORNEYS.

Patented Aug. 14, 1951 2,564,048

UNITED STATES PATENT OFFICE 2,564,048

CARRIER AND RADIO TERMINATION FOR TELEPHONE CIRCUITS

Everhard H. B. Bartelink, Bronxville, and Edward Daskam, Jr., Brooklyn, N. Y., assignors, by mesne assignments, to Automatic Electric Laboratories, Inc., Chicago, Ill., a corporation of Delaware Application September 16, 1948, Serial No. 49,546

17 Claims. (Cl. 179—41)

This invention pertains to improvements in termination units for carrier current and radio telephone channels, and to communication systems incorporating the same.

A primary object of the invention is to provide a termination unit of this character which may be easily and quickly modified by simple wiring changes made on a wiring panel or "option board," for adapting the unit to any of several applications, such, for example, as a ring-down toll circuit termination, as well as for a central office termination and also an associated distant end termination for connecting a single- or multi-party subscribers' line over a carrier circuit or radio link to a central office. The termination unit of the invention is operative to transmit dialing pulses over automatic exchange telephone connections, as well as to transmit ringing current over both automatic and manual exchange connections. It is also operative to transmit steady supervision signals to central office equipment, either manual or automatic.

The termination unit of the invention comprises, in its essentials, a two-wire, voice-frequency circuit which is transformer-coupled to a hybrid coil, and thence, through the latter, in conventional fashion, to high-frequency transmitter and receiver units, respectively, either carrier current wire circuit or radio links, as the case may be. The construction and operation of the termination unit is such that when wired to provide termination units for the opposite ends of a carrier channel or radio link, ring-down toll circuit, the carrier current in each direction is normally on; and, alternatively, when wired to provide central office and associated distant end terminations in a carrier channel or radio link interposed in a subscriber's circuit, the carrier outgoing from the central office is normally on, while the distant end carrier is normally off, but is switched on when a subscriber removes his receiver or handset from the hook.

Ringing current is transmitted over the carrier or radio channel in the form of carrier current interruptions. For purposes of converting ringing current applied to the voice-frequency or metallic terminal circuits, into corresponding carrier current interruptions of the carrier or radio link, the terminating unit of the invention is provided with a biased or polar relay which is intermittently energized by outgoing ringing current, correspondingly to interrupt the outgoing carrier, and concurrently therewith, continuously to energize, during the ringing interval, a transmitter slow release relay. The latter short-circuits the voice-frequency input to the high-frequency transmitter, and also prevents, as explained below, ringing current which may, by chance, be incoming over the carrier or radio link, from being transmitted to the voice-frequency terminating circuit.

Conversely, for translating ringing current interruptions of incoming carrier into corresponding alternating ringing current applied by the terminal to the voice-frequency, metallic circuit, the high-frequency receiver has incorporated therein a carrier relay which is normally de-energized by the received carrier, but which responds to interruptions thereof, to apply an intermittent ground to operating circuits for a carrier repeat relay and a receiver slow release relay. Both the carrier and carrier repeat relays are fast operating, and hence follow ringing current interruption of the received carrier. The receiver slow release relay, however, is continuously energized throughout the ringing interval, by the intermittent ground referred to. The slow release relay, when thus operated, completely disconnects the input to the radio or carrier channel, from the terminal voice-frequency, or metallic circuit, and in place thereof, bridges across the latter, a filter network, including a condenser which is alternately charged and discharged from and to battery and ground connections, applied through contacts of the carrier repeat relay, which latter, as above stated, follows ringing current interruptions of the incoming carrier. These interruptions are thus converted by the carrier repeat relay and associated condenser and filter network, into alternating ringing current, of corresponding periodicity, transmitted over the terminal voice-frequency or metallic circuit.

So long as the receiver slow release relay remains energized by ringing current interruptions of the incoming carrier, the aforesaid polar relay is held de-energized, to prevent the transmission of ringing current interruptions to the outgoing carrier. This results from the fact that the polar relay is included in the portion of the carrier or radio input which is disconnected by operation of the receiver slow release relay, from the terminating voice-frequency or metallic circuit. Conversely the aforesaid operating circuit for the receiver slow release relay is completed through make contacts of the transmitter slow release relay thus to prevent operation of the receiver slow release relay, while ringing current is being transmitted on an outgoing call.

By providing additional contacts on the carrier relay, the carrier repeat relay may be eliminated, since its function in applying alternate battery and ground to the condenser for generating ringing current in the metallic circuit, can thus be taken over by the carrier relay. However, since the carrier relay must respond to carrier currents of relatively small magnitude, it is preferable not to load its contacts with the relatively heavy condenser charging and discharging currents for the metallic ringing circuit, and for this reason it is preferable to add the carrier repeat relay to the circuit.

As stated, the termination unit of the invention may be wired on the option board to provide central office and associated distant end terminations for connecting a remote subscriber's line over a carrier or radio link to the central office. As thus arranged, the subscriber's telephone set is connected to the distant end termination unit over the usual subscriber's loop comprising a two-wire metallic circuit, the circuit arrangement being such that when the subscriber removes his telephone set from the switch hook to initiate a call, it closes a direct current path from battery supplied at the distant end termination unit, through the polar relay thereat, and over the subscriber's metallic loop circuit and through the subscriber's switch hook contacts. The resulting operation of the polar relay in turn actuates the transmitter relay at the distant end termination, to switch on the outgoing carrier. This carrier incoming to the central office termination unit releases the carrier and carrier repeat relays thereat. The release of the latter completes, through its armature and back contact, a direct current bridge across the two-wire, voice-frequency circuit of the central office termination unit. For manual operation, this voice-frequency circuit will terminate at the central office switchboard in a line jack provided with a line relay and associated line lamp connected to a battery, which are thus energized by closure of the aforesaid bridging path upon release of the carrier repeat relay, thereby to signal the operator of the incoming call. And since, as above stated, the carrier outgoing from the central office is normally switched on, the connection from the distant subscriber's telephone set to the central office is thus arranged for two-way conversation. The central office operator answers the call in the usual manner by plugging her cord circuit into the line jack, thereby to extinguish the line lamp, and at the same time to light a supervision lamp in the operator's cord circuit from battery therein over the bridging circuit referred to. The operator, upon receiving the called number from the calling station, completes the call in the usual manner. When the call is complete and the calling subscriber hangs up, the polar relay at the distant end termination releases, to release the transmitter relay thereat, thus to switch off the outgoing carrier. This energizes the carrier and carrier repeat relays at the central office termination, energization of the latter opening the aforesaid D. C. path bridged across the two-wire, voice-frequency circuit of the central office termination, thus extinguishing the supervisory lamp in the operator's cord circuit, to advise her that the call is terminated. The operator accordingly disconnects, thereby restoring the central office termination unit to normal.

On calls incoming to the subscriber connected to the distant end termination, the central office operator inserts her cord plug into the line jack at the central office termination and applies ringing current. The resulting ringing current-interrupted carrier incoming to the distant end termination, intermittently energizes the carrier and carrier repeat relays thereat, while continuously energizing the slow release relay thereat, thereby to transmit ringing current over the subscriber's loop in the manner above described.

In the event the subscriber's telephone set is equipped for dialing, the two-wire, voice-frequency metallic circuit of the central office termination unit is connected to automatic telephone exchange selector equipment rather than to a line jack. This automatic telephone exchange equipment will normally apply battery in conventional manner between the conductors of the metallic circuit. Accordingly, when the distant end subscriber removes his receiver from the switch hook to close his loop circuit, the polar relay of the distant end termination will be energized by the aforesaid flow of current over the subscriber's loop supplied from battery at the distant end termination. The resulting operation of the polar relay actuates the transmitter relay at the distant end termination, to switch on the outgoing carrier. And this carrier incoming to the central office termination releases the carrier and carrier repeat relays thereat, as above described, the latter to re-establish the direct current path bridged across the voice-frequency metallic circuit of the central office termination unit, completed through the armature and back contact of the carrier repeat relay. Accordingly, direct current supplied from battery of the automatic exchange selectors will flow through this direct current bridging circuit. Therefore, when the distant end subscriber actuates his dialing equipment to transmit dialing pulses, this will open his loop circuit in accordance with the dialing pulses to be transmitted, which dialing pulse interruptions will correspondingly actuate the polar relay of the distant end termination, and this, in turn, will correspondingly actuate the transmitter relay thereat, thus to interrupt the outgoing carrier in accordance with the dialing pulses to be transmitted. These dialing pulse interruptions of the carrier incoming to the central office termination will correspondingly actuate the carrier and carrier repeat relays thereat, the latter to open and close the bridging circuit referred to, thus correspondingly to interrupt the current supplied to the bridging circuit from the automatic exchange selector equipment. In this way, the dialing pulses of the subscriber's dialing equipment are transmitted to the automatic exchange selectors at the central office, to actuate the same in accordance with the station called. When the call is completed and the distant end subscriber hangs up, the carrier outgoing from the distant end termination is switched off in the manner aforesaid, thereby to energize the carrier and carrier repeat relays at the central office termination. Energization of the latter opens the aforesaid bridging circuit thereat, to release the automatic exchange selector equipment.

Having thus described the invention in general terms, reference will now be had, for a more detailed description thereof, to the accompanying drawings, wherein:

Fig. 2 is a circuit diagram of the Fig. 1 circuit, as wired, however, on the option board to provide a termination unit for a carrier or radio ring-down toll circuit; while Fig. 2*a* shows the corresponding wiring connections, as made on the option board. The circuit arrangement and connections illustrated in Figs. 2 and 2*a* are referred to herein as "option A."

Figures 1, 1A:
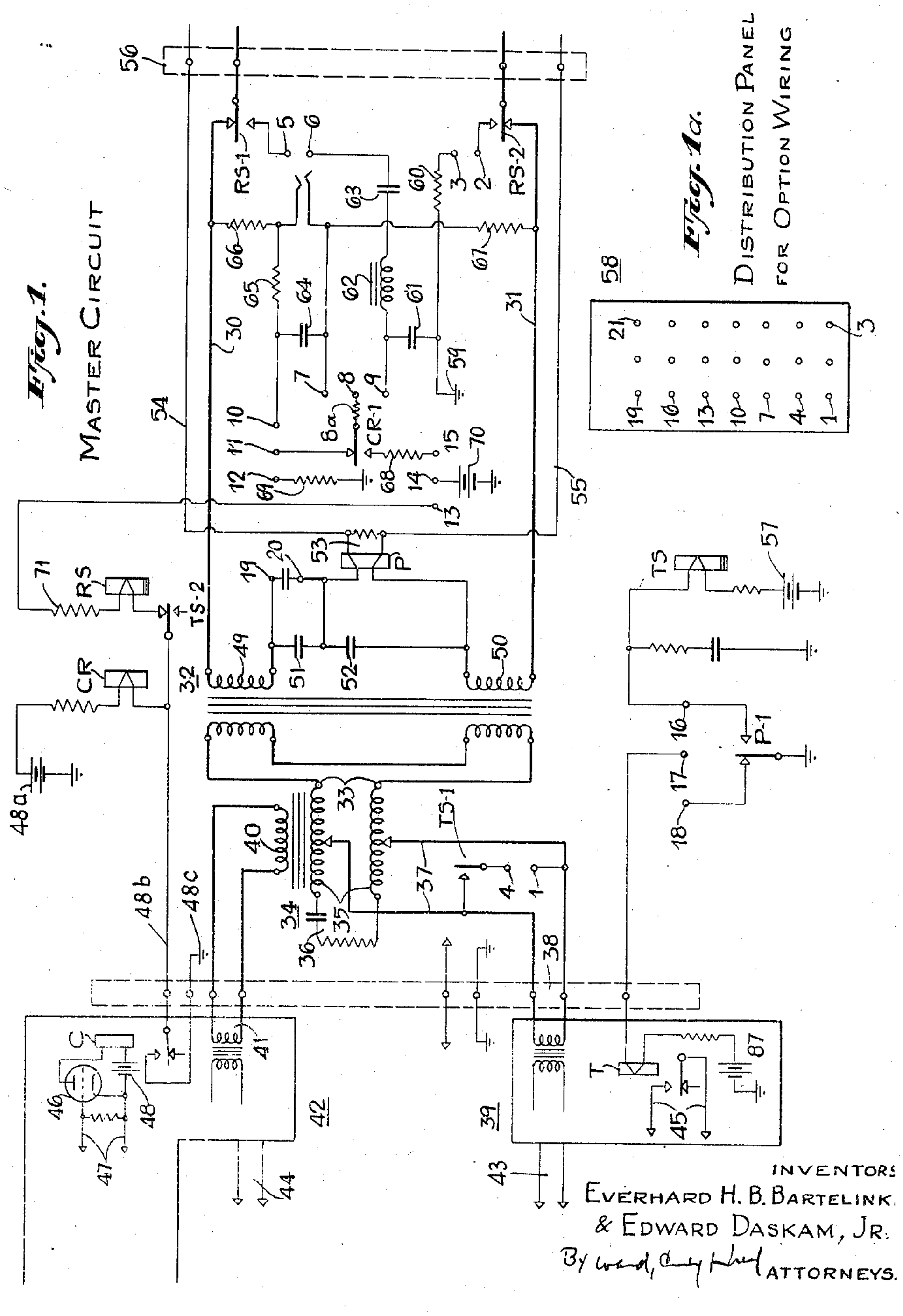
Fig. 1 is a "master circuit" diagram of a termination unit in accordance with the present invention, wherein all wiring connections on the option board have been omitted.
Fig. 1*a* is a view in front elevation of the option board, showing the wiring terminals thereon.

Fig. 3 shows the Fig. 1 circuit as wired on the option, to provide a central office termination unit for a radio or carrier link, interposed between the central office and a distant single- or multi-party subscribers' metallic telephone line; while Fig. 3*a* shows the corresponding wiring connections on the option board. The circuit and connections of Figs. 3 and 3*a* are referred to herein as "option B."

Figures 4, 4A:
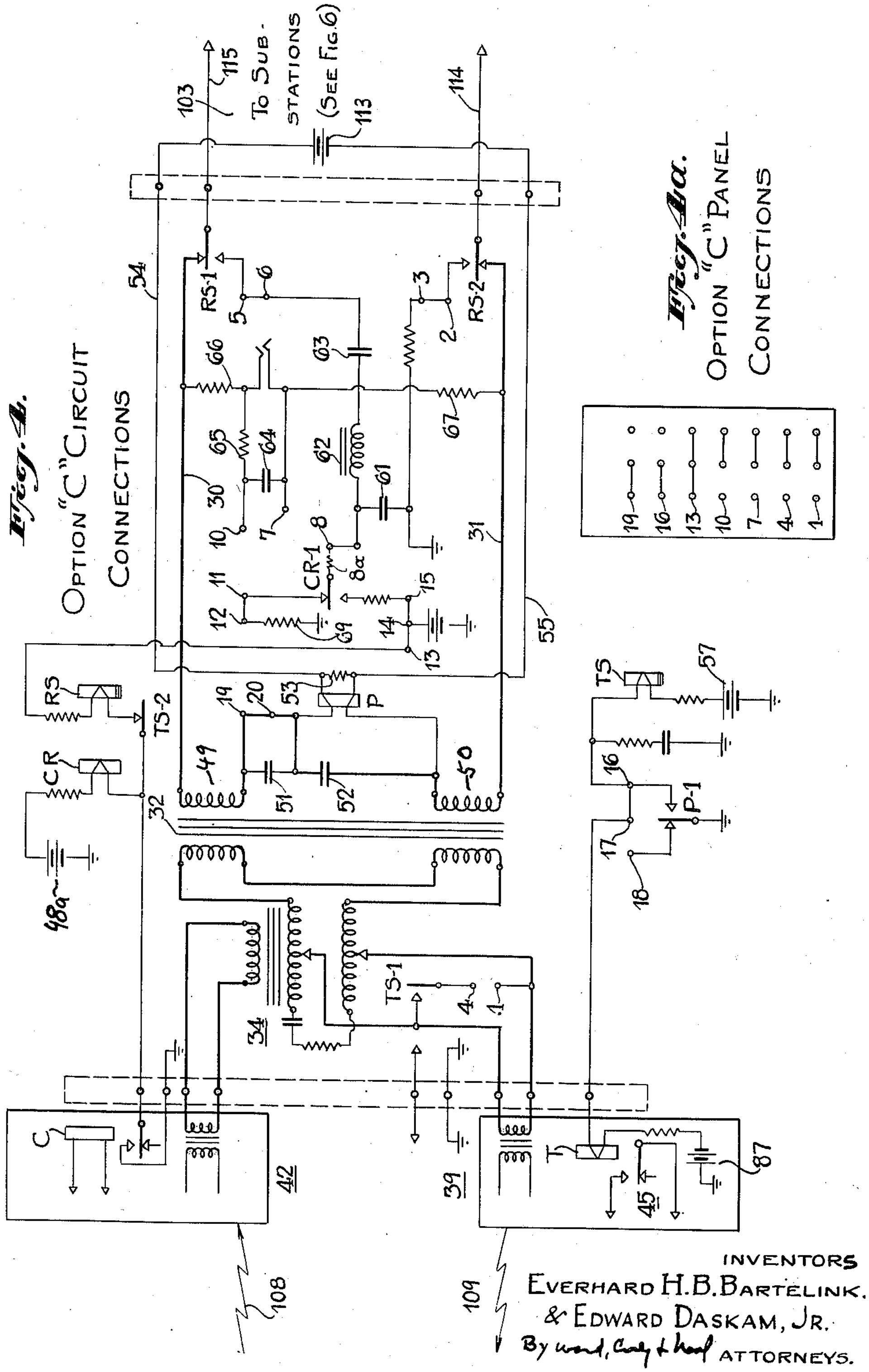

Fig. 4 illustrates the Fig. 1 circuit as wired on the option board to provide the distant end termination unit in a radio or carrier link interposed between a central office and a single- or multi-party subscribers' wire line at the distant end; while Fig. 4*a* shows the corresponding wiring connections on the option board.

Figures 2, 2A:
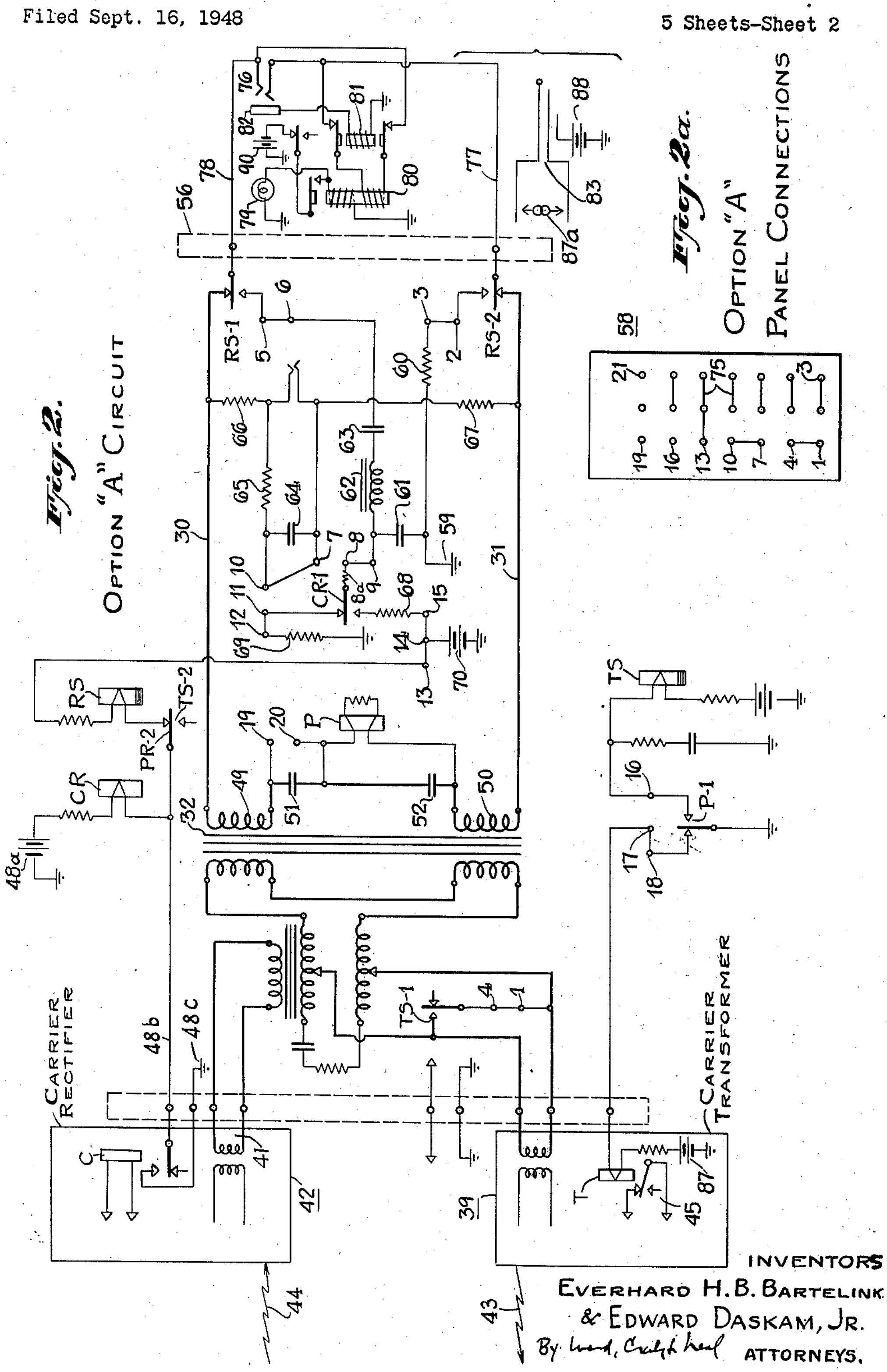
Figures 5, 6:
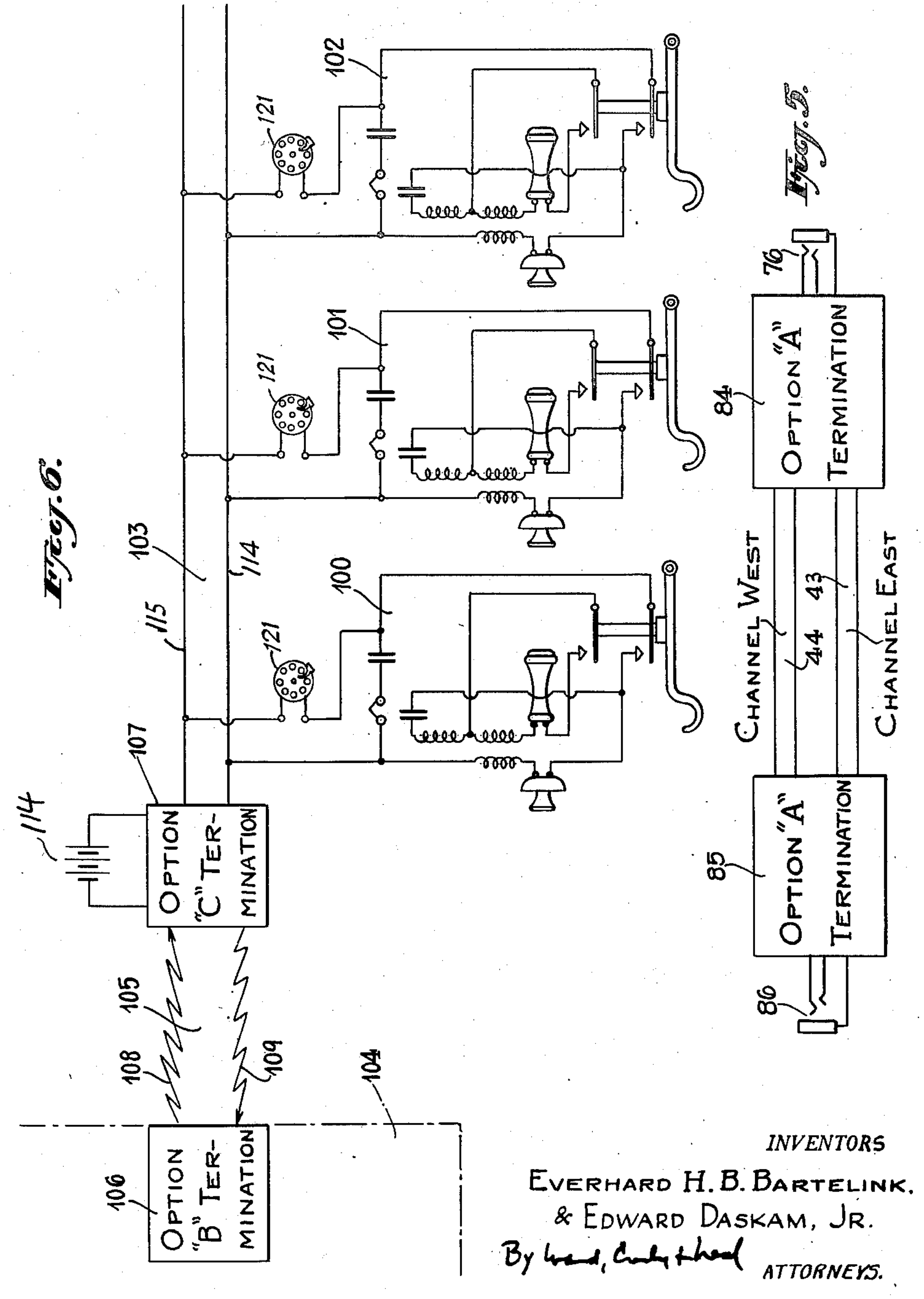

Fig. 5 is a diagrammatic view of a four-wire, carrier, ring-down toll circuit employing termination units at each end, in accordance with "option A" of the present invention, as illustrated in Figs. 2 and 2*a*.

Fig. 6 is a more or less schematic circuit diagram of a multi-party subscribers' telephone line, wherein the various subscribers' sets are connected over a local or community two-wire, metallic circuit, and wherein this two-wire circuit is linked to a distant central office through an interposed radio or carrier link, which latter is terminated at the central office in a termination unit in accordance with "option B" of the present invention, as illustrated in Figs. 3 and 3*a*, and is terminated at the distant or community end, in a termination unit in accordance with "option C" of the present invention, as illustrated in Figs. 4 and 4*a*.

Referring now to the master circuit of Figs. 1 and 1*a*, the termination unit of the present invention comprises, in its essentials, a two-wire, voice-frequency, metallic circuit, 30, 31, which is coupled through an iron core transformer 32, to the input terminals 33 of an iron core hybrid coil 34, having connected to its opposite terminals 35, a resistance-capacity or other appropriate line-balancing network 36. The midpoints of the hybrid coil are connected over conductors 37 to the voice-frequency input 38 of a high-frequency, radio or carrier current transmitter 39, and the "cake" winding 40 of which is connected to the voice-frequency output 41 of a radio or carrier current receiver 42. For illustrative purposes only, these units are shown as carrier current transmitter and receiver units, respectively, the voice-modulated, high-frequency output of the transmitter being applied to an outgoing, two-wire metallic circuit 43, of a four-wire carrier current system, the incoming high-frequency metallic circuit 44 of which terminates in the carrier current receiver 42, the demodulated, voice-frequency output of which is applied, as stated, over the voice-frequency output circuit 41 to the hybrid coil 34 through the winding 40 thereof. The transmitter 39 includes a transmitter relay T, for switching on the transmitter carrier current, over a circuit which includes connections 45, extending respectively to the armature and front contact of the T relay.

The receiver 42 includes a carrier relay C connecter in the plate circuit of a grid-controlled, electronic tube 46, the grid or input circuit 47 of which has applied thereto during reception of incoming carrier, a rectified carrier current component of negative polarity. The plate circuit of the tube 46 is so energized from a plate battery 48, that when no carrier current is being received, the C relay will be energized, but during reception of carrier current the rectified carrier component of negative polarity aforesaid, impresses a negative biasing voltage on the grid of tube 46, of such magnitude as to reduce the plate current below the operating level for relay C, whereby this relay is released during carrier current reception. The C relay completes through its armature and grounded front contact, operating circuits for a carrier repeat relay CR, and a receiver slow release relay RS. The operating circuit for the CR relay is traced from the grounded battery 48*a*, over conductor 48*b* to ground at 48*c*; while the operating circuit for the RS relay is dependent upon the wiring of the option board, as described hereinafter. The carrier repeat relay CR and the receiver slow release relay RS serve the functions described generally above and discussed more in detail hereinafter in connection with the options A to C circuit arrangements. It may be noted at this point, however, that the RS relay is provided with contacts RS—1 and RS—2, the back contacts of which are connected respectively to conductors 30, 31 of the voice circuit, while the front contacts are connected to the ringing current generator network described below, the armatures or center contacts being wired to a panel strip 56, for purposes of extending the voice circuit to a central office or to subscriber's loop, also as explained below.

It should also be noted at this point that the carrier relay C may be so connected in the circuit of the receiver 42, as to be energized directly by a rectified component of the received carrier, in which event the ground at 48—C would be connected to the back contact instead of to the front contact of the C relay, in order to obtain the same operation of the CR and RS relays above described, i. e., energization of these relays when no carrier is received or when the carrier is interrupted. However, this modification in general requires the inclusion of an additional electronic tube in the circuit of the carrier receiver 42, so that a simpler receiver circuit arrangement is secured with the circuit arranged as first described, and as illustrated in the drawing.

The voice-frequency input transformer 32 includes a pair of primary windings 49 and 50, which are interconnected at their inner terminals through a pair of serially connected condensers 51, 52. A two-winding polar relay P, is connected at the inner terminals of its respective windings across condenser 52, the outer terminals of these windings being bridged by a resistance 53, interposed between a pair of connections 54, 55 extending to the terminal strip 56, for purposes explained hereinafter. The polar relay is provided with contacts P—1 which control the operation of the transmitter relay T and also of the above mentioned transmitter slow release relay TS, the former as described below, and the latter over a circuit traced from grounded battery 57 and including the P—1 make contact and grounded center contact or P—1 armature of the P relay. The TS relay has a TS—2 armature and back contact included in the operating circuit of the RS relay, to prevent operation of the latter when ringing current is outgoing; and also a TS—1 armature and front contact for shorting the voice-frequency input circuit 38 to the transmitter 39 during such periods, as explained below.

The master circuit includes, in its physical embodiment, an option board 58, Fig. 1*a*, on which are mounted a series of twenty-one terminals or soldering lugs numbered 1 to 21 inc., respectively, the terminals or lugs 1 to 20 inc. of which are wired into the master circuit in the manner shown by the like numbered terminals 1 to 20 inc., respectively, of Fig. 1, and for purposes of wiring the master circuit according to options A to C inc., of Figs. 2 to 4 inc., as explained below.

Reverting to Fig. 1, it will be noted that terminals 1 and 4 are interposed in the above mentioned shorting circuit, which includes contacts TS—1 of the TS relay. Terminals 2 and 3 are connected respectively to the make RS—2 contact of the RS relay and to a connection extending to the ground at 59 through a resistance 60, which ground is also connected to terminal 6 through a connection which includes in series a condenser 61, a choke coil 62 and a condenser 63, forming part of the ringing current generator network above mentioned. The associated terminal 5 of the option board is in turn connected to a make RS—1 contact of the RS relay. These terminals thus serve to connect or disconnect the ringing generator circuit as required. Terminals 7 and 10 of the option board are connected to opposite sides, respectively, of a condenser 64, the upper terminal of which is connected through resistors 65 and 66 to the back RS—1 contact, while the lower terminal of condenser 64 is connected through a resistor 67 to the back RS—2 contact, these components having significance as applied to the options A to C inc. circuits discussed above and below. To the same end, terminal 8 of the option board is connected through a resistance 8*a* to the CR—1 armature or center contact of the CR relay, the associated back contact of which is connected to terminal 11, and the associated front contact of which is connected through a resistance 68 to terminal 15 of the option board. Terminals 12 and 14 thereof are connected respectively to ground through a resistor 69 and through a battery 70 to ground, all forming part of the ringing current generator, as explained below. Terminals 16, 17 and 18 of the option board are connected respectively to the front P—1 contact of the P relay, to the T relay winding, and to the P—1 back contact, in order to wire the T relay for transmitter carrier normally off or on operation, as required. Terminal 13 is connected through a current limiting resistor 71 to the upper winding terminal of the RS relay, for energizing this relay from battery 70 under certain options. Terminals 19 and 20 are connected respectively to the opposite terminals of condenser 51, for shorting out the condenser under certain options.

The various components of the master or Fig. 1 circuit and associated distribution panel, Fig. 1*a*, have thus been identified, for purposes of describing the options A to C, inclusive, circuit arrangements and connections now to be discussed.

Referring now to the Figs. 2 and 2*a* modification of the master circuit for terminating carrier or radio links on ring-down toll lines, various of the terminal lugs 1 to 21 of the distribution panel 58 are interconnected by wire straps, as at 75, Fig. 2*a*, thereby providing the circuit arrangement and connections of Fig. 2, except for the addition at the right of the terminal strip 58, of equipment comprising a switchboard jack 76, the tip and sleeve conductors 77, 78 of which are respectively connected to the RS—1 and RS—2 center contacts of the RS relay. Jack 76 is provided with a line or supervisory lamp 79, which is energized by a line or supervisory relay 80, under control of a sleeve relay 81, connected in the sleeve circuit 82 of jack 76, the operation being as explained below. The operator's cord circuit for plugging into jack 76, is indicated at 83.

Referring to Fig. 5, the four-wire, carrier, ring-down toll circuit thereof, is terminated at its opposite ends, in termination units in accordance with the option "A" circuit of Fig. 2, as indicated at 84 and 85 respectively, the channels "east" and "west" of the carrier circuit being indicated at 43 and 44, respectively. The termination units 84, 85 are provided with switchboard jacks 76 and 86, arranged as in Fig. 2, for extending the connection in both directions.

Consider now the operation of the ring-down toll circuit of Fig. 5 in connection with Fig. 2. It will be noted that the T relays, in the transmitter units at each end of the circuit, are normally energized, as illustrated in Fig. 2, from grounded battery 87 through the T relay winding, to ground through strapped distribution panel terminals 17, 18 and the P—1 back contact and center contact of the normally de-energized polar relay P. Thus the carrier outgoing and incoming over channels 43, 44 to each termination unit 84, 85, is normally on.

Assume now that the operator at termination 84 desires to ring the operator at termination 85, Fig. 5. Referring to Fig. 2, the operator at termination 84 will insert her cord plug 83 into jack 76, and apply ringing current 87*a*. Insertion of the cord plug into the jack will operate relay 81 in the sleeve circuit, from negatively grounded battery 88 connected to the cord sleeve to ground through the winding of relay 81. Operation of relay 81 prevents operation of the line relay 80 and accompanying operation of the supervisory lamp 79, in the manner explained below. The alternating ringing current 87 applied to cord circuit 83 will flow over the voice-frequency circuit comprising conductors 78, 30, primary winding 49 of transformer 32, condenser 51, thence in parallel through condenser 52 and the windings in series of the polar relay P, transformer primary 50, returning over conductors 31 and 77. Since the polar relay is normally biased against its back P—1 contact, the polar relay will be energized by the ringing current, only on alternate half cycles thereof, thereby periodically releasing and operating the T relay over its operating circuit above traced, extending to ground through the back P—1 contact and center contact of the polar relay. This operation of the T relay, periodically switches the carrier on and off in the transmitter 39, thereby to interrupt the carrier outgoing over channel 43 in accordance with the ringing current.

Prior to receipt of these ringing current, carrier interruptions, the distant termination unit 85, will be in the condition illustrated in Fig. 2. That is to say, the C, CR and RS relays will be released thereat, as explained above. The C relay will follow the ringing current interruptions of the incoming carrier, thereby to apply through its grounded front contact and armature, an intermittent ground to the carrier repeat and receiver slow release relays, CR and RS respectively. The CR relay energized from battery 48a, repeats the operations of the C relay. The RS relay is fast to operate but slow to release, and hence will pull up upon the first few operations of the C relay, and thereafter remain energized throughout the ringing interval, over an energizing circuit traced from grounded battery 70, through the strapped terminals 13, 14 of the option board, thence through the RS relay winding, back TS—2 contact and armature of the normally de-energized TS relay, to intermittent ground at the C relay. Operation of the RS relay disconnects, at its back RS—1 and RS—2 contacts, the voice-frequency, metallic circuit 30, 31, extending to the carrier transmitter and receiver units, and substitutes therefor, the ringing current generator network, traced from the upper front RS—1 contact through the strapped option board terminals 5, 6, condenser 63, inductance 62, condenser 61, resistor 60, and strapped terminals 3, 2, to the front RS—2 contact. Thus with the RS relay energized, as explained, the circuit just traced will be bridged between conductors 77, 78, extending respectively to the tip and ring of the operator's jack 76. It will also be noted that whereas the lower terminal of condenser 61 is connected to ground at 59, the upper terminal thereof is now connected through the strapped option board terminals 8, 9, to the CR—1 armature or center contact of the CR relay, the back contact of which is now connected through the strapped terminals 11, 12 to the grounded resistor 69, and the front contact of which is now connected through resistor 68, and strapped terminals 14, 15, to the grounded battery 70.

With the circuit as thus arranged, and with the CR relay following the ringing current interruption of the incoming carrier, its CR—1 armature will be actuated alternately between its grounded back contact and its battery-connected front contact. Condenser 63 will thus be alternately charged from battery 70, and discharged to ground through resistor 69 over a circuit traced from the CR—1 armature through inductance 62, condenser 63, the RS—1 front contact and armature, conductor 78, lower back contact and armature of relay 81, lower winding of relay 80, upper armature and back contact of relay 81, conductor 77, RS—2 armature and front contact, and resistance 60 to ground at 59. The resulting charging and discharging of condenser 63 over the circuit traced, will provide an alternating current, of ringing frequency, traversing the lower winding of relay 80, which operates this relay. Relay 80 upon thus operating immediately locks up over a circuit traced from grounded battery 90, through the second upper back contact and armature of relay 81, armature and front contact of relay 80, and through the upper winding thereof to ground. Relay 80, upon operating, energizes the supervisory lamp 79, from battery 90 through the armature and front contact of relay 80, to ground through the lamp. This signals the operator, who thereupon responds by inserting her cord plug 83 into jack 76, thus operating the line relay 81, from battery 88 to ground through the relay winding, thereby releasing relay 80 and extinguishing the line lamp.

In the ringing circuit above described, condenser 61 and inductance 62 comprise a filter section for eliminating high-frequency components, such as would otherwise cause objectionable clicks whenever the operator's set is bridged across the line.

It will be observed that the operating circuit for the RS relay above traced, includes the TS—2 back contact and armature of the TS relay. And since, as above pointed out, the operating circuit for the TS relay is traced through the P—1 front contact and armature of the polar relay P, the RS relay cannot be operated by ringing current interruptions incoming over the carrier receiving channel 44, during the intervals that the polar relay P is being actuated by ringing current transmitted thereto through jack 76, i. e., outgoing ringing current. Conversely, once the RS relay has been energized by ringing current incoming over carrier channel 44, the polar relay P cannot be energized by outgoing ringing current, so long as the RS relay remains energized by incoming current. This results from the fact, above pointed out, that when the RS relay operates, it disconnects at its RS—1, RS—2 contacts, the voice circuit 30, 31, including the polar relay P, from jack 76. Thus, if the line is first seized for an outgoing call, the call cannot be interrupted by incoming ringing current during the interval that the outgoing ringing current is being transmitted, and vice versa, if the line is first seized for an incoming call.

One other feature to be noted with respect to the operation of this Fig. 2 circuit, is that during intervals when ringing current is outgoing and the TS relay thus operated, it short circuits the voice-frequency input to the carrier transmitter, over the shorting circuit traced through the TS—1 front contact and armature of the TS relay, and the strapped distribution panel terminals 1, 4.

When the operator disconnects her cord plug 83 from jack 76, for example at the conclusion of a call, the line relay 81 will release, thus restoring the entire terminal unit circuit to its normal condition, as illustrated in Fig. 2.

Referring now to Fig. 6, consider a situation wherein it is convenient to interconnect a series of party-line subscribers' stations, such as 100, 101, 102, over a two-wire, party-line metallic circuit 103, but wherein it is impractical, or unduly expensive, to extend the voice-frequency metallic circuit 103 into a central office located, for example, some distance away, as at 104. Under such circumstances, the central office 104 and the subscriber's party line circuit 103, may be interconnected over a carrier or radio link. For providing suitable termination units for such carrier or radio link at the central office and distant ends thereof, the circuit modifications of Figs. 3 and 4, i. e., options B and C, are respectively applicable.

Thus, still referring to Fig. 6, the circuit arrangement of option B would be employed as the termination unit at the central office end of an interposed carrier or radio link 105, as indicated by termination 106; while for the distant or community end termination of the radio link, the option C termination would be employed, as indicated at 107. The carrier or radio signals outgoing from the central office are indicated at 108, while those transmitted thereto from the distant end termination, are indicated at 109.

For the central office or option B termination 106, Fig. 6, the cross connections on the option board will be as shown in Fig. 3a, resulting in the circuit arrangement of Fig. 3, wherein all components of the master circuit, which do not enter into operation of the option B circuit, have been omitted for simplicity in the showing. In the Fig. 3 showing the option B termination is shown connected to a manual exchange switchboard, including a line jack and associated relays and line lamp elements 76, 80, 81 and 79, connected and operating in generally the manner above described in connection with Fig. 2. For the distant end termination 107, Fig. 6, the cross connections on the option board will be as shown in Fig. 4*a*, resulting in the circuit arrangement of Fig. 4, wherein, again, all components of the master circuit which do not enter into the operation of the option C circuit, have been omitted for simplicity in showing.

Referring now to Figs. 3 and 4, in conjunction with Fig. 6, the operation is as follows. In the central office termination unit 106, i. e., Fig. 3, the carrier current transmitted therefrom, is normally on, since the T relay is normally energized from grounded battery 87, through the T relay winding, strapped terminals 17 and 18 of the option board, to ground through the P—1 back contact and grounded armature of the polar relay P. Thus carrier is normally outgoing from the central officee transmitter, whereby the carrier relay C in the distant end termination unit 107, i. e., Fig. 4, is normally released, and the associated CR and RS relays thereat, are likewise normally released. Also, in the distant end termination unit, Fig. 4, the carrier outgoing from the transmitter thereat, is normally off, due to the fact that the operating circuit for the T relay in the Fig. 4 termination, is traced from the grounded battery 87 through the T relay winding and thence through the strapped panel terminals 17 and 16 to the front P—1 contact of the polar relay P.

Assume now that the central office operator desires to ring one of the subscribers on the party line 103. The operator inserts plug 83 of her cord circuit 111 into the jack 76, Fig. 3, and applies ringing current 87*a* by operation of key 112. Insertion of the cord plug operates line relay 81, and thus disconnects the supervisory relay 80, to prevent lighting of line lamp 79. The ringing current thus applied, intermittently actuates and releases the polar relay P, in the manner above explained in connection with Fig. 2, thereby intermittently to actuate the transmitter relay T, thus providing ringing current interruptions to the carrier outgoing from the central office transmitter, Fig. 3, and at the same time continuously energizing the central office TS relay, throughout the ringing interval, to short circuit the voice input to the transmitter thereat through closure of contacts TS—1. The ringing-current-interrupted carrier transmitted from the central office and incoming to the distant end receiver, Fig. 4, intermittently actuates and releases the C relay thereat, thereby correspondingly actuating the CR relay, while continuously energizing the RS relay, as above explained, the latter throughout the ringing interval. Operation of the RS relay transmits ringing current over the party line in the same manner as above described in connection with Fig. 2, i. e., by alternately connecting battery and ground at its CR—1 contacts to condenser 63 for charging and discharging the same. When the called subscriber 100, 101 or 102, Fig. 6, answers by removing his receiver from the hook, the polar relay P at the distant end termination, Fig. 4, will be energized, as soon as an interruption in the ringing occurs, over a circuit traced from battery 113 thereat, over conductor 55 and through the lower winding of the P relay, thence over conductors 31 and 114 of the subscribers' loop 103, and through the subscribers' set, returning over the upper conductors 115, 30, and through the upper winding of the polar relay, and back to battery 113 over conductor 54. The polar relay is thus continuously energized over this circuit, thereby to operate its P—1 armature against the front contact, to energize the transmitter relay T, thereby switching on the carrier outgoing from the distant end termination, Fig. 4. This carrier incoming to the central office termination unit, Fig. 3, releases the carrier and carrier repeat relays C and CR thereat. Release of the latter completes, through its CR—1 armature and back contact, a direct current bridging circuit between conductors 30, 31, traced through resistances 66, 65, strapped terminals 10, 11, CR—1 back contact and armature of the CR relay strapped terminals 8 and 7 and resistance 67. This bridging circuit completes a circuit to energize the supervision relay 116 in the operator's cord circuit 111, this circuit being traced from battery 117 therein through relay 116, through the sleeve conductors of plug and jack 83, 76, over conductors 77, 31 and through the bridging circuit referred to, returning thence over conductors 30, 78, and through the tip conductors of the jack and plug to battery 117. Operation of the supervisory relay 116 energizes the supervision lamp 118 from grounded battery 119 and through the armature and front contact of the supervision relay 116. The operator is thus advised that the called subscriber has answered. Meantime, and at the distant end termination, Fig. 4, operation of the P relay, also operates the TS relay, but since panel terminals 1 and 4 are not strapped, the voice input to transmitter 39 is not shorted by closure of the TS—1 contacts. The TS—2 contacts, however, interrupt the circuit for the RS relay. The circuit is thus ready for two-way conversation between the subscriber and the central office operator, who completes the call as requested.

When the calling subscriber hangs up at the end of the call, the polar relay P at the distant end termination, Fig. 4, releases, to release the transmitter relay T thereat, thereby to switch off the outgoing carrier, which, in turn, actuates the C and CR relays at the central office termination, Fig. 3. Operation of the latter opens, at its CR—1 contacts, the bridging circuit 65, 66, 67, thus releasing the supervisory relay 116 of the operator's cord circuit, thereby extinguishing the supervisory lamp 118, to advise the operator of this fact. When the operator disconnects her plug 110 from jack 76, the sleeve relay 81 releases, whereby all circuits are restored to normal.

Assume now that a subscriber, such as 100, desires to originate a call. When the subscriber removes his receiver from the hook, it switches on carrier outgoing from the distant end transmitter, Fig. 4, in the manner above explained. The carrier thus outgoing from the distant end termination, releases the carrier relay C in the central office receiver, Fig. 3, thus to release the CR relay, the CR—1 armature of which thereupon is actuated to its back contact, which closes the loop circuit 65—67 to energize the operator's line lamp 79 at the switchboard jack 75. This loop circuit is traced as follows: from grounded battery 90 through the upper winding of line relay 89, thence through the upper armature and back contact of relay 81, over conductors 77 and 31 and through resistor 67, thence through the CR—1 armature and back contact of the CR relay, through the strapped terminal connections 11, 10, through resistors 65 and 66, and over conductors 30 and 78, and through the lower back contact and armature of relay 81, to ground through the lower winding of relay 80. Relay 80 is energized over the circuit, to energize the line lamp 79 from battery 90 through the armature and front contact of relay 80 to ground through lamp 79. Optionally this circuit may include a relay 119, energizable to complete a circuit 120 through its armature and front contact to operate a pilot lamp, bell or other auxiliary signaling device. When the central office operator inserts her cord plug 83 into jack 76, line relay 81 will be energized over the sleeve circuit from battery 88, and will thus open at its upper and lower back contacts, the energizing circuit above traced for relay 80, which thereupon releases to extinguish the line lamp 79.

When the calling subscriber hangs up, the polar relay P, Fig. 4, releases to release the T relay and thus switch off the carrier outgoing to the central office. This energizes the C and CR relays, Fig. 3, thereat, the latter to open the DC bridging current 65—67, thus releasing relay 116 in the operator's cord circuit to extinguish the supervision lamp 118. The operator thereupon disconnects her cord plug 83 to release the line relay 81, whereby all circuits are restored to normal.

Referring to Fig. 6, the subscriber's telephone sets 100 to 102 may be provided with dialing units, such as 121, for transmitting dialing pulses to the central office, in the event the subscriber's stations are connected over the radio or carrier link 105, to an automatic telephone exchange. In such case, conductors 77 and 78, Fig. 3, of the option B or central office termination, would be connected to automatic telephone exchange selecting equipment, rather than to a line jack 76 as shown. This automatic telephone exchange equipment would normally apply battery, in conventional manner, between conductors 77 and 78, to transmit current through the direct current bridge 65—67 connected between conductors 30 and 31, as soon as the CR relay becomes de-energized. As above explained, the CR relay is normally energized when no carrier is incoming to the central office termination, Fig. 3, until a subscriber at 100 to 102 inc., Fig. 6, removes his receiver from the hook. When this occurs, however, the subscriber's loop circuit, above traced, is closed from battery 113, Fig. 4, of the option C or distant end termination, over conductors 103 and through the subscriber's telephone set including the contacts of dial 121. Current transmitted over this loop operates the polar relay P of the distant end termination, Fig. 4, which in turn operates the transmitter relay T thereat to switch on the outgoing carrier, as above explained. Accordingly, when the subscriber actuates dial 121, the current transmitted over this loop circuit will be interrupted in accordance with the dialing pulses, thus to interrupt the outgoing carrier in accordance with dialing pulses. Referring now to the central office or option B termination, Fig. 3, the carrier, when switched on at the distant end termination as aforesaid will release the C and CR relays thereat, the latter to close the bridging circuit 66, 65, 67 through the back contact and CR—1 armature of the CR relay. During the reception of the dial pulses, however, the C and CR relays will be energized in accordance with dialing interruptions of the incoming carrier. With each such interruption the CR relay will operate to open the bridging circuit at the CR—1 contacts, thus to relay the dialing pulses into the automatic telephone equipment for selecting the station called. When the calling subscriber hangs up all circuits are restored to normal by release of the P and T relays at the distant end termination, Fig. 4, thus energizing the central office CR relay, Fig. 3, the latter to open the bridging circuit 65—67 and thus restore the automatic exchange selectors to normal. On incoming calls the central office polar relay P is intermittently actuated to transmit ringing current to the distant end subscriber 100—102, in the manner above described.

In the appended claims the term "carrier" is meant to embrace both radio and wire circuits or channels employing carrier.

What is claimed is:

1. A termination unit for radio and carrier telephone systems, comprising: a carrier transmitter, including a transmitter relay energizable to switch on outgoing carrier; a carrier receiver, including a receiver relay responsive to incoming carrier; a metallic, voice-frequency circuit, hybrid-coupled to the input and output of said transmitter and receiver, respectively; means including a polar relay and series condenser interposed in said metallic circuit, to permit of intermittently energizing said transmitter relay in response to alternating ringing current received over said metallic circuit; means including an option board having strapping terminals for shorting said condenser, to permit of providing direct current supervision and dialing pulse operation of said polar relay; means for translating ringing current interruptions of said incoming carrier into alternating ringing current applied to said metallic circuit, including a condenser, together with charging and discharging circuits therefor, completed through contacts of said receiver relay and strapping terminals on said option board and means for energizing a supervision signaling device in response to ringing current interruptions of said incoming carrier, and optionally for energizing automatic exchange selectors in response to dialing current interruptions of said incoming carrier; said means including a resistance and series condenser bridged across said metallic circuit, together with strapping terminals on said option panel to permit of shunting said condenser through contacts of said receiver relay.

2. A termination unit for radio and carrier telephone systems, comprising: a carrier transmitter, including a transmitter relay energizable to switch on outgoing carrier; a carrier receiver, including a receiver relay responsive to incoming carrier; a metallic, voice-frequency circuit, hybrid-coupled to the input and output of said transmitter and receiver, respectively; means including a polar relay and series condenser interposed in said metallic circuit, to permit of intermittently energizing said transmitter relay in response to alternating ringing current received over said metallic circuit; means including an option board having strapping terminals for shorting said condenser, to permit of providing direct current supervision and dialing pulse operation of said polar relay; means for translating ringing current interruptions of said incoming carrier into alternating ringing current, including a condenser, together with battery charging and discharging circuits therefor, completed through contacts of said receiver relay and strapping terminals on said option board; a slow release receiver relay continuously energized in response to the said ringing current interruptions of said incoming carrier, for connecting said alternating ringing current means to said metallic circuit and for concurrently disconnecting said polar relay therefrom; a slow release transmitter relay energized by said polar relay for preventing operation of said slow release receiver relay during operation of said polar relay; means for energizing a supervision signaling device in response to ringing current interruptions of said incoming carrier and optionally for energizing automatic exchange selectors in response to dialing current interruptions of said incoming carrier, said means including a resistance and series condenser bridged across said metallic circuit, together with strapping terminals of said option board to permit of shunting said condenser through contacts of said receiver relay.

3. A termination unit for radio and carrier telephone systems, comprising: a carrier transmitter, including a transmitter relay energizable to switch on outgoing carrier; a carrier receiver, including a receiver relay responsive to incoming carrier; a metallic, voice-frequency circuit, hybrid-coupled to the input and output of said transmitter and reeciver, respectively; means including a polar relay for controlling the energization of said transmitter relay, means for optionally energizing said transmitter relay intermittently in response to alternating current received over said metallic circuit and for alternatively providing direct current supervision and dialing pulse operation of said polar relay comprising respectively a condenser and means for connecting said condenser and said polar relay in series and to said metallic circuit and means for metallically connecting said polar relay to said metallic circuit; means for translating ringing current interruptions of said incoming carrier into alternating ringing current applied to said metallic circuit, including a condenser, together with charging and discharging circuits therefor, completed through contacts of said receiver relay.

4. A termination unit for radio and carrier telephone systems, comprising: a carrier transmitter, including a transmitter relay energizable to switch on outgoing carrier; a carrier receiver, including a normally de-energized receiver relay and means for energizing the same in response to interruptions of incoming carrier; a metallic, voice-frequency circuit, hybrid-coupled to the input and output of said transmitter and receiver, respectively; means including a polar relay and series condenser interposed in said metallic circuit, for intermittently energizing said transmitter relay in response to alternating ringing current received over said metallic circuit; means for translating ringing current interruptions of said incoming carrier into alternating ringing current applied to said metallic circuit, including a condenser, together with charging and discharging circuits therefor, completed through contacts of said receiver relay, for alternately charging and discharging said condenser in response to said incoming carrier current interruptions.

5. A termination unit for radio and carrier telephone systems, comprising: a carrier transmitter, including a transmitter relay energizable to switch on outgoing carrier; a carrier receiver, including a normally de-energized receiver relay and means for energizing the same in response to interruptions of incoming carrier; a metallic, voice-frequency circuit, hybrid-coupled to the input and output of said receiver, respectively; means including a polar relay and series condenser interposed in said metallic circuit for intermittently energizing said transmitter relay, in response to alternating ringing current received over said metallic circuit; means for translating ringing current interruptions of said incoming carrier into alternating ringing current, including a condenser, together with charging and discharging circuits therefor, completed through contacts of said receiver relay; a slow release reeciver relay, continuously energized in response to said interruptions of said incoming carrier, for connecting said alternating ringing current means to said metallic circuit, and for concurrently disconnecting said polar relay therefrom; a slow release transmitter relay energized by intermittent ringing current operation of said polar relay, for preventing operation of said slow release receiver relay while said polar relay is thus operating; and means including contacts on said slow release transmitter relay, for short-circuiting the input to said carrier transmitter during operation of said relay.

6. A termination unit for radio and carrier telephone systems, comprising: a carrier transmitter, including a transmitter relay energizable to switch on outgoing carrier; a carrier receiver, including a receiver relay responsive to incoming carrier, a metallic, voice-frequency circuit, hybrid-coupled to the input and output of said carrier transmitter and receiver, respectively; an energizing circuit for said transmitter relay, including a front contact of a normally de-energized polar relay whereby said transmitter relay is normally de-energized and hence transmission of outgoing carrier is prevented; said polar relay being interposed in said metallic circuit, together with means including a switch for energizing said polar relay, thereby to energize said transmitter relay; and means for translating ringing current interruptions of said incoming carrier into alternating ringing current applied to said metallic circuit, said means including a condenser, together with charging and discharging circuits therefor, completed through contacts of said receiver relay.

7. A termination unit for radio and carrier telephone systems, comprising: a carrier transmitter, including a transmitter relay energizable to switch on outgoing carrier; a carrier receiver, including a receiver relay responsive to incoming carrier; a metallic, voice-frequency circuit, hybrid-coupled to the input and output of said transmitter and receiver, respectively; means including a polar relay and series condenser interposed in said metallic circuit, for intermittently energizing said transmitter relay in response to alternating ringing current received over said metallic circuit; means for translating ringing current interruptions of said incoming carrier into alternating ringing current applied to said metallic circuit, including a condenser, together with charging and discharging circuits therefor, completed through contacts of said receiver relay; a supervision relay energized by said ringing current; and a signaling device energized by said supervision relay.

8. A termination unit for radio and carrier telephone systems, comprising: a carrier transmitter, including a transmitter relay energizable to switch on outgoing carrier; a carrier receiver, including a receiver relay responsive to incoming carrier; a metallic, voice-frequency circuit, hybrid-coupled to the input and output of said transmitter and receiver, respectively; means including a polar relay and series condenser interposed in said metallic circuit, for intermittently energizing said transmitter relay in response to alternating ringing current received over said metallic circuit; means for translating ringing current interruptions of said incoming carrier into alternating ringing current applied to said metallic circuit, including a condenser, together with charging and discharging circuits therefor, completed through contacts of said receiver relay; a line jack having tip and ring connections to said metallic circuit, and a line relay in the sleeve circuit thereof; a supervisory relay connected to said metallic circuit through contacts of said line relay, said supervisory relay being energized by said ringing current; a locking circuit for said supervisory relay; a signaling device energized thereby; and means responsive to insertion of a cord plug in said jack for energizing said line relay to release said supervisory relay and signaling device.

9. A termination unit for radio and carrier telephone systems, comprising: a carrier transmitter, including a transmitter relay energizable to switch on outgoing carrier; a carrier receiver, including a receiver relay responsive to incoming carrier; a metallic, voice-frequency circuit, hybrid-coupled to the input and output of said transmitter and receiver, respectively; an energizing circuit for said transmitter relay, including back contacts of a normally de-energized polar relay for normally transmitting outgoing carrier; said polar relay and a series condenser being interposed in said metallic circuit, for intermittently releasing said transmitter relay in response to alternating ringing current received over said metallic circuit; a line jack having tip and ring connections to said metallic circuit, and having a sleeve circuit containing a line relay; a supervisory relay connected to said metallic circuit through back contacts of said line relay; means for energizing said supervisory relay in response to interruptions of said incoming carrier, including a direct current path, bridged across said metallic circuit through contacts of said receiver relay; a locking circuit for said supervisory relay; and means responsive to insertion of an operator's cord plug in said jack, for energizing said line relay, to release said supervisory relay.

10. A termination unit for radio and carrier telephone systems, comprising a carrier transmitter, including a transmitter relay energizable to switch on outgoing carrier; a carrier receiver, including a receiver relay responsive to incoming carrier; a metallic, voice-frequency circuit, hybrid-coupled to the input and output of said transmitter and receiver, respectively; means including a polar relay interposed in said metallic circuit, for intermittently energizing the said transmitter relay in response to dialing current interruptions received over said metallic circuit; means for translating ringing current interruptions of said incoming carrier into alternating ringing current applied to said metallic circuit, including a condenser, together with charging and discharging circuits therefor, completed through contacts of said receiver relay.

11. A termination unit for radio and carrier telephone systems, comprising a carrier transmitter, including a transmitter relay energizable to switch on outgoing carrier; a carrier receiver, including a receiver relay responsive to incoming carrier; a metallic, voice-frequency circuit, hybrid-coupled to the input and output of said transmitter and receiver, respectively; means including a polar relay and a series condenser interposed in said metallic circuit for intermittently energizing the transmitter relay in response to alternating ringing current received over said metallic circuit; and means for energizing automatic exchange selectors in response to dialing current interruptions of said incoming carrier, including a resistance in series with contacts of said receiver relay, bridged across said metallic circuit.

12. A termination unit for radio and carrier telephone systems, comprising a carrier transmitter, including a transmitter relay energizable to switch on outgoing carrier; a carrier receiver, including a receiver relay responsive to incoming carrier; a metallic voice frequency circuit hybrid-coupled to the input and output of said transmitter and receiver, respectively; means including a polar relay and a series condenser interposed in said metallic circuit for intermittently energizing the transmitter relay in response to alternating ringing current received over said metallic circuit; and means for energizing automatic exchange selectors in response to dialing current interruptions of said incoming carrier, including a resistance and series condenser bridged across said metallic circuit, together with connections for shunting said condenser through contacts of said receiver relay.

13. In a subscriber's telephone circuit, linked by carrier to a central office: central office and distant end terminations for said carrier link, each including a carrier transmitter and a carrier receiver, hybrid-coupled to a voice-frequency, metallic circuit, the central office metallic circuit terminating in a line jack, and the distant end metallic circuit having connected thereto a switch-actuated telephone set, each carrier transmitter being provided with a transmitter relay for switching on outgoing carrier, and said carrier receiver at said distant end being provided with a receiver relay responsive to incoming carrier; a circuit including a back contact of a polar relay normally energizing the transmitter relay at said central office, said polar relay, in series with a condenser, being interposed in the central office metallic circuit and responding intermittently to alternating ringing current applied thereto intermittently to actuate the transmitter relay thereat to interrupt the outgoing carrier at ringing frequency, and thereby intermittently to actuate the receiver relay at the distant end termination; means at said distant end termination for translating said carrier current interruptions into alternating ringing current applied to the metallic circuit thereat, said means including a condenser, together with charging and discharging circuits therefor, completed through contacts of said receiver relay, thereby to ring the subscriber's station; said distant end termination including a polar relay and a direct current circuit for energizing the same in response to removal of the subscriber's receiver from said switch hook, said distant end polar relay energizing the transmitter relay thereat, through a front contact thereof, to switch on the distant end outgoing carrier, means responsive to said carrier incoming to the central office for energizing a supervisory signaling device thereat, said last-mentioned means including a direct current connection bridged across the metallic circuit thereat, a supervisory relay and means for energizing the same bridged across said metallic circuit through back contacts of a line relay, a locking circuit for said supervisory relay, and a signaling device energized thereby; and a sleeve circuit containing said line relay; and means responsive to insertion of a plug in said jack for energizing said line relay to release the supervisory relay and thereby de-energize said signaling device.

14. In a telephone system: a carrier circuit terminating at one end in a normally energized carrier transmitter, and at the opposite end in a carrier receiver, each being transformer coupled to a metallic circuit thereat, relay means in the metallic circuit at said transmitter, intermittently responsive to ringing current applied to said metallic circuit, for correspondingly interrupting the outgoing carrier, and means at said carrier receiver, including a relay responsive to said carrier current interruption, and a condenser together with charging and discharging circuits therefor, said relay having contacts which connect said discharging circuit of the condenser to said metallic circuit thereat and which cause the condenser to alternately charge and discharge thereby to generate in the metallic circuit thereat, ringing current corresponding to said carrier interruptions.

15. In a telephone system: a two-way carrier circuit terminating at each end in carrier transmitter and receiver units hybrid-coupled to a metallic circuit thereat, means normally energizing each said transmitter to transmit outgoing carrier in each direction, means at each said end for periodically interrupting the outgoing carrier in accordance with ringing current applied to the metallic circuit thereat, said means including a polar relay intermittently actuated by said ringing current, a transmitter fast relay intermittently responsive thereto and a transmitter slow relay continuously energized thereby, and means at each said end for generating ringing current in the metallic circuit thereat in response to said periodically interrupted carrier received thereat, said means including a carrier fast relay intermittently actuated by said interruptions and a receiver slow relay continuously energized thereby, and a condenser alternately chargeable and dischargeable through contact of said receiver fast relay, each said receiver slow relay being energizable to disconnect the polar relay from the metallic circuit thereat during reception of said interrupted carrier, and each said transmitter slow relay being operative to disconnect the receiver slow relay thereat during transmission of interrupted carrier.

16. In a subscriber's telephone circuit linked by carrier to a central office: central office and distant end terminations for said carrier, each including carrier transmitter and receiver units hybrid-coupled to metallic circuits thereat, one such metallic circuit extending to the central office and the other comprising a subscriber's loop connected to a subset, means including a polar relay in said subscriber's loop and responsive to removal of the receiver of said subset from its hook for switching on carrier outgoing from said distant end termination, and thereafter responding to dialing pulses transmitted from said subset for correspondingly interrupting said outgoing carrier, means including a carrier relay at said central office termination responsive to carrier incoming thereto for closing a direct current bridge across the metallic circuit thereat, said carrier relay responding to said dialing interruption of said carrier, correspondingly to interrupt said direct current bridge for relaying said dialing interruptions.

17. In a subscriber's telephone circuit linked by carrier to a central office: central office and distant end terminations for said carrier, each including carrier transmitter and receiver units hybrid-coupled to metallic circuits thereat, one such metallic circuit extending to the central office and the other comprising a subscriber's loop connected to a subset, means including a polar relay in said subscriber's loop and responsive to removal of the receiver of said subset from its hook for switching on carrier outgoing from said distant end termination, and thereafter responding to dialing pulses transmitted from said subset for correspondingly interrupting said outgoing carrier, means including a carrier relay at said central office termination responsive to carrier incoming thereto for closing a direct current bridge across the metallic circuit thereat, said carrier relay responding to said dialing interruption of said carrier, correspondingly to interrupt said direct current bridge for relaying said dialing interruptions, and means for transmitting ringing current applied to said central office metallic circuit over said carrier link to said subset, including a polar relay at the central office termination, intermittently responsive to said ringing current for correspondingly interrupting the carrier outgoing therefrom, a carrier repeat relay at said distant end terminations responsive to said interrupted carrier received thereat, and a condenser alternately chargeable and dischargeable through contact of said relay for generating in the metallic circuit thereat, ringing current corresponding to said carrier interruptions.

EVERHARD H. B. BARTELINK.
EDWARD DASKAM, Jr.

REFERENCES CITED

The following references are of record in the file of this patent:

UNITED STATES PATENTS

| Number | Name | Date |
|---|---|---|
| 1,528,010 | Demarest | Mar. 3, 1925 |
| 1,688,451 | Demarest | Oct. 23, 1928 |
| 1,688,452 | Demarest | Oct. 23, 1928 |
| 1,688,453 | Demarest | Oct. 23, 1928 |
| 1,688,454 | Demarest | Oct. 23, 1928 |
| 2,265,056 | Bowers | Dec. 2, 1941 |
| 2,454,498 | Bartelink | Nov. 23, 1948 |
| 2,457,434 | Bartelink | Dec. 28, 1948 |